(12) United States Patent
Hon

(10) Patent No.: US 12,186,626 B2
(45) Date of Patent: Jan. 7, 2025

(54) REFLEXIVE TRAINING APPARATUS

(71) Applicant: ROLLBOTT LLC, Las Vegas, NV (US)

(72) Inventor: Samuel Hon, Las Vegas, NV (US)

(73) Assignee: ROLLBOTT LLC, Las Vegas, NV (US)

( * ) Notice: Subject to any disclaimer, the term of this patent is extended or adjusted under 35 U.S.C. 154(b) by 0 days.

(21) Appl. No.: 18/491,453

(22) Filed: Oct. 20, 2023

(65) Prior Publication Data

US 2024/0131395 A1 Apr. 25, 2024
US 2024/0226656 A9 Jul. 11, 2024

Related U.S. Application Data

(60) Provisional application No. 63/380,555, filed on Oct. 21, 2022.

(51) Int. Cl.
*A63B 24/00* (2006.01)

(52) U.S. Cl.
CPC .. *A63B 24/0006* (2013.01); *A63B 2024/0015* (2013.01); *A63B 2208/0228* (2013.01); *A63B 2208/0252* (2013.01); *A63B 2220/806* (2013.01); *A63B 2220/836* (2013.01)

(58) Field of Classification Search
CPC ............... A63B 24/0006; A63B 69/34; A63B 2024/0015; A63B 2208/0228; A63B 2208/0252; A63B 2220/806; A63B 2220/836; A63B 69/215; A63H 3/00
See application file for complete search history.

(56) References Cited

U.S. PATENT DOCUMENTS

| | | | |
|---|---|---|---|
| 4,770,412 A * | 9/1988 | Wolfe | A63B 69/215 446/226 |
| 10,561,920 B2 * | 2/2020 | Wagner | A63B 69/215 |
| 11,311,788 B1 * | 4/2022 | Bourassa-Fulop | A63B 69/215 |

FOREIGN PATENT DOCUMENTS

| | | | | |
|---|---|---|---|---|
| CA | 3059150 A1 * | 4/2021 | | A45C 13/02 |
| WO | WO-2014146136 A1 * | 9/2014 | | A63B 24/0003 |

* cited by examiner

*Primary Examiner* — Sundhara M Ganesan
*Assistant Examiner* — Jacqueline N L Loberiza
(74) *Attorney, Agent, or Firm* — Kwan & Olynick LLP

(57) ABSTRACT

A reflexive training apparatus for mixed martial arts training. The training apparatus includes limbs with joints that simulate actual human joints and also simulate how a human joint would respond to different pressures, bars, locks, holds, breaks, and hyperextensions. In addition, the training apparatus is configured to go into several guard positions and to respond to a user's actions in a manner similar to how a real opponent would respond during a grappling session. In some embodiments, the training apparatus comprises a composite of materials that make the training apparatus sturdy enough to simulate the weight and feel of an actual person.

20 Claims, 17 Drawing Sheets

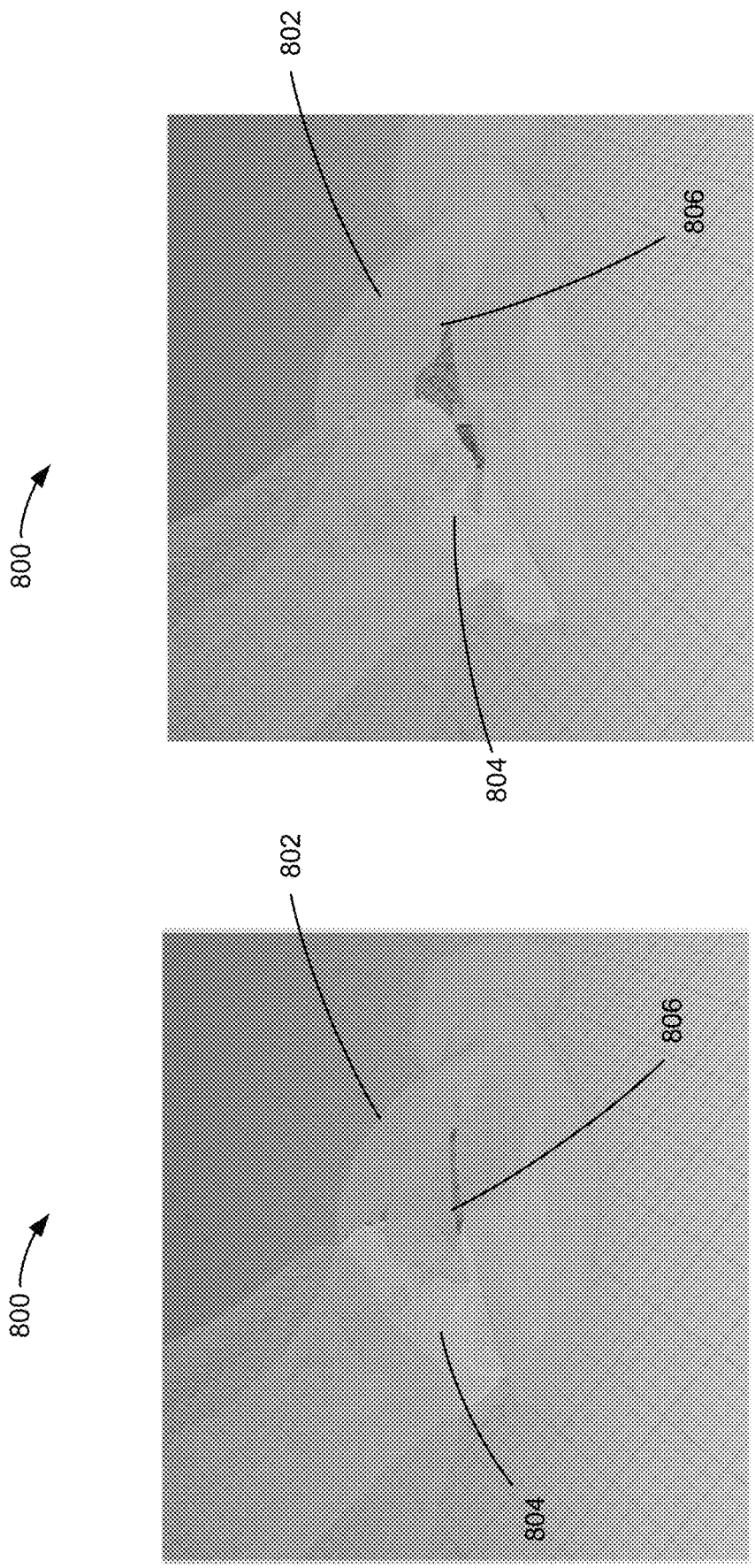

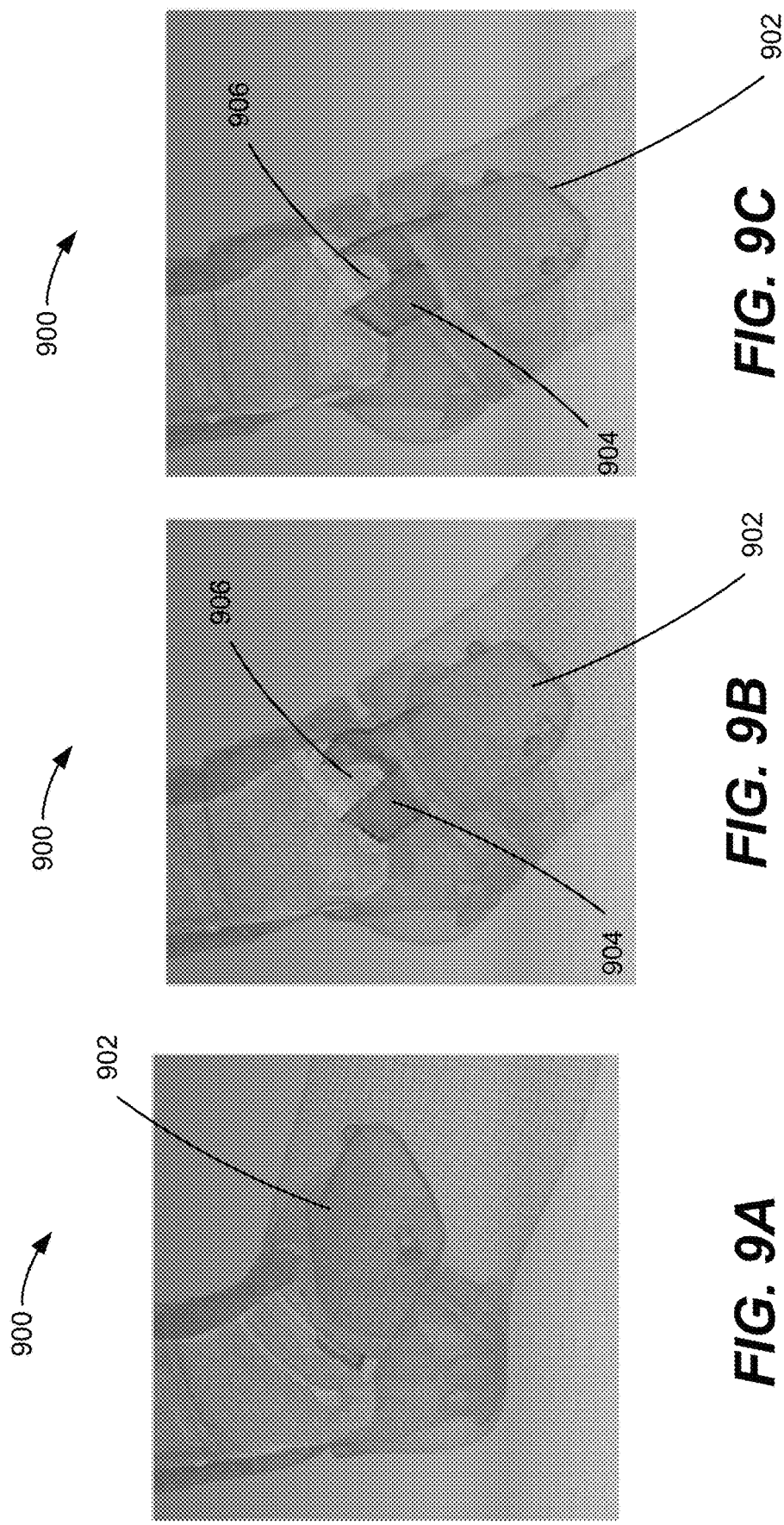

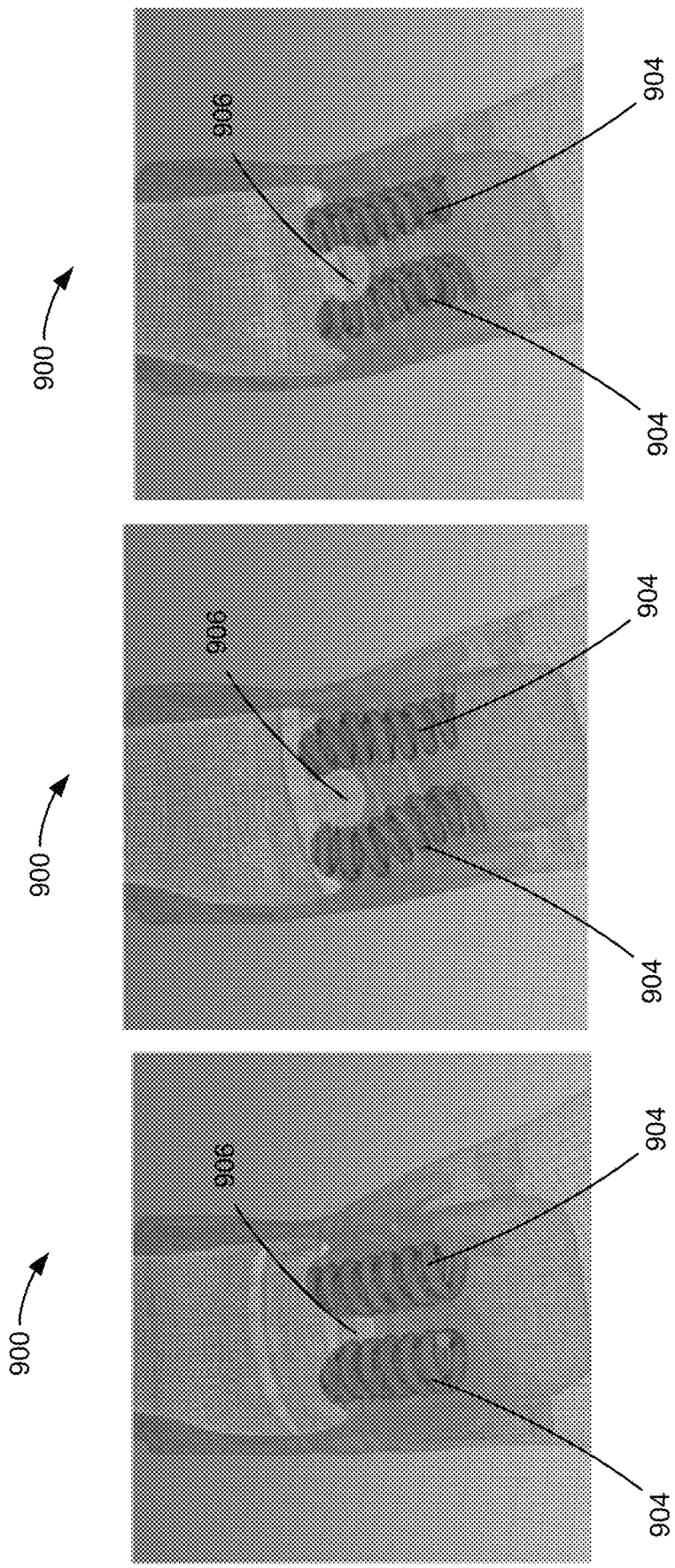

REFLEXIVE TRAINING APPARATUS

CROSS-REFERENCE TO RELATED APPLICATIONS

This application claims priority to Provisional U.S. Patent Application No. 63/380,555, titled "Reflexive Training Apparatus," filed on Oct. 21, 2022, by Samuel Hon, which is incorporated herein by reference in its entirety and for all purposes.

TECHNICAL FIELD

The present disclosure relates generally to sports training, and more specifically to mixed martial arts training.

DESCRIPTION OF RELATED ART

The sport of mixed martial arts is becoming increasingly popular. Practicing mixed martial arts provides various health benefits and instills mental discipline. However, in most instances, practicing mixed martial arts requires intense grappling work with another individual. During a pandemic, such close encounters with other individuals may not be feasible. In addition, current training "dummies" on the market do not respond in realistic manners that simulate the experience of grappling with an actual person. Thus, there is a need for a training apparatus that mimics the reflexes and responses of an actual person.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

Aspects of the present disclosure relate to a reflexive training apparatus and a system. The reflexive training apparatus and system comprise a body including a head, neck, and four limbs. The body is configured to assume sitting and supine guard positions, as well as a turtle position without collapsing, in response to physical interaction with a user. The neck includes sensors for indicating effective choke positions and pressure. The four limbs include joints that provide tactile simulation of injuries resulting from moves executed on the limbs by the user.

In some embodiments, while the body is in the turtle position, the body can support up to 250 lbs on its back without collapsing. In some embodiments, while the body is in the supine position, the body is touching the ground with a curved back curving away from the ground. In some embodiments, the four limbs include an elbow joint that simulates an arm break with a bone protrusion. In some embodiments, the four limbs include a knee joint that simulates a ligament injury with tactile feedback. In some embodiments, the reflexive training device and system further comprise one or more cameras for recording training sessions. In some embodiments, the reflexive training device and system further comprise a processor to control electronic features. In some embodiments, the reflexive training device and system further comprise one or more of the following: a display, led lights, position sensors, motion sensors, pressure sensors, audio functions, and an outer covering configured to emulate skin. In some embodiments, the joints are mechanical. In some embodiments, the reflexive training device and system further comprise Wifi and Bluetooth capabilities.

The disclosure may best be understood by reference to the following description taken in conjunction with the accompanying drawings, which illustrate particular embodiments.

BRIEF DESCRIPTION OF THE DRAWINGS

The disclosure may best be understood by reference to the following description taken in conjunction with the accompanying drawings, which illustrate particular embodiments.

FIGS. 8A-8F show an example of an elbow dislocation, in accordance with embodiments of the present disclosure.

FIGS. 9A-9G show an example of an elbow dislocation, in accordance with embodiments of the present disclosure.

DESCRIPTION OF EXAMPLE EMBODIMENTS

Figure 1:
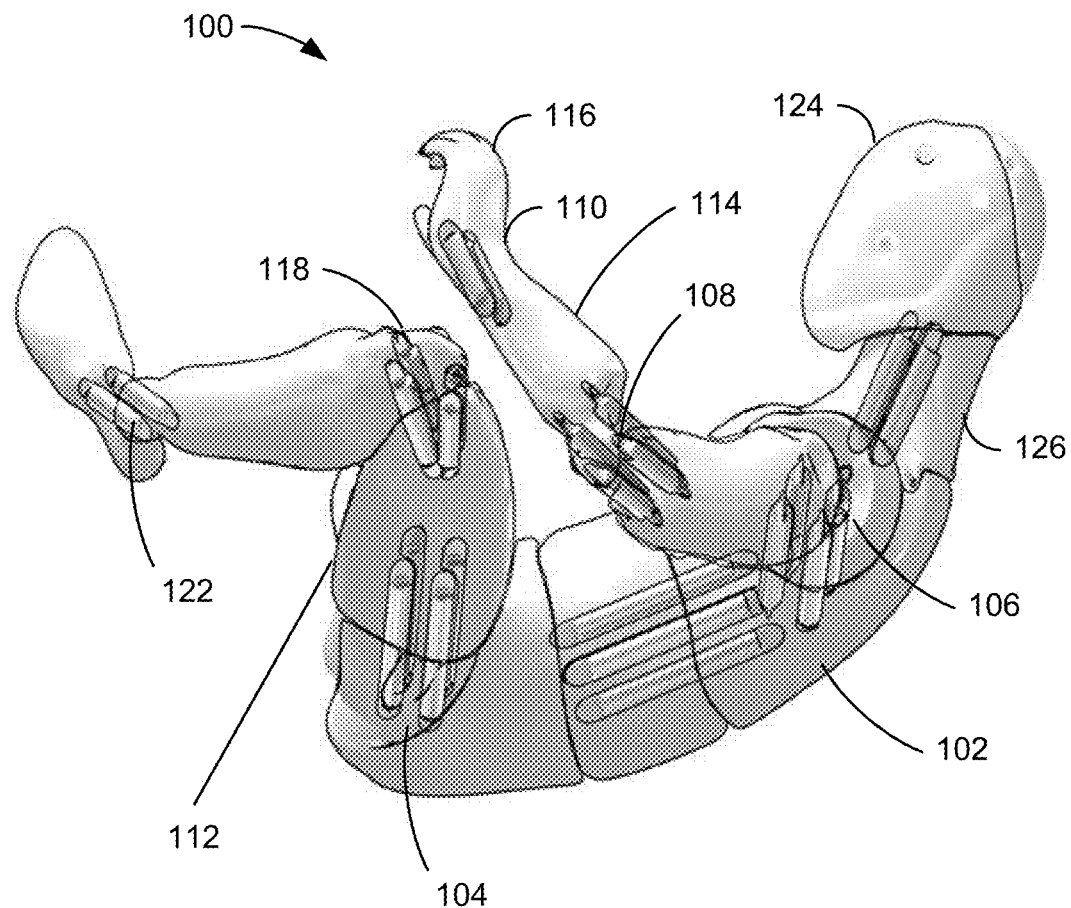
FIG. 1 shows an example of a reflexive training apparatus, in accordance with embodiments of the present disclosure.

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, portions of the techniques of the present disclosure will be described in the context of a reflexive training apparatus. However, it should be noted that the techniques of the present disclosure apply to a wide variety of different apparatuses. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a reflexive training apparatus can be used in a variety of contexts. However, it will be appreciated that a system can use multiple different apparatuses while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a hand may be connected to a body, but it will be appreciated that a variety of intermediate connections, such as a forearm, may reside between the hand and the body. Consequently, a connection does not necessarily mean a direct, unimpeded connection unless otherwise noted.

As mentioned above, there is a need for a training apparatus that mimics the reflexes and responses of an actual person. The techniques and mechanisms of the present disclosure provide for a martial arts apparatus that simulates realistic grappling exchanges, joint manipulation, and chokes that can be used on opponents in martial arts, wrestling, jiu-jitsu, and law enforcement. In some embodiments, the apparatus includes the capability of simulating catastrophic joint breaks with tactile feedback. In addition, in some embodiments, the apparatus includes the capability of providing visual feedback using LEDs. In some embodiments, the apparatus is configured to mimic the same attributes of an average male, with its weight being configurable from 60 pounds and up. In such embodiments, the weight of the apparatus adds more realism to practicing fine movements and control. In some embodiments, the apparatus is produced from materials such as flexible plastics, rubber, polyurethane, springs, bolt hardware, and various electronics. In some embodiments, all limbs are in a specific configuration thereby creating a supine guarding body position. In some embodiments, some of the major joint groups use a spring cluster in specific configurations to emulate muscles and ligaments. In some embodiments, when a user moves the apparatus into specific positions, the apparatus is configured to naturally use its weight distribution and spring cluster orientations to positionally defends itself.

FIG. 1 shows an example of a reflexive training apparatus, in accordance with embodiments of the present disclosure. According to various embodiments, apparatus 100 includes all major external body parts, such as limbs, but may not be described in detail in this disclosure. For the purposes of this disclosure, only certain body parts will be highlighted and described in detail in order to help one of ordinary skill in the art to better understand the reflexive training functions of apparatus 100. Apparatus 100 includes a hollow torso 102. In some embodiments, torso 102 is hollow to allow springs to connect the upper portion of torso 102 and pelvis/hip 104. In some embodiments, torso 102 includes up to 4 ports for springs. In such embodiments, the number of springs attached to the ports varies depending on the flexibility desired for apparatus 100. For example, apparatus 100 can have 4 springs attached to the 4 ports to provide a more rigid body. In some embodiments, two front-to-back springs measure 350 mm and have a resistance capacity of 1400 lbs. In some embodiments, to provide additional resistance, two 250 mm springs are positioned on the sides.

According to various embodiments, torso 100 also includes two shoulder assemblies 106. In some embodiments, each shoulder assembly 106 comprises 3 springs, connecting from the upper portion of torso 102 to arm 114. In some embodiments, 1 of the 3 springs is longer (e.g., by 30%) than the other two springs in order to allow more freedom of movement of the shoulder joint, or shoulder assembly 106. In some embodiments, shoulder assembly 106 includes a wedge that acts as a support structure and gives shape to the torso around the shoulder area. In some embodiments, shoulder assembly 106 includes a trapezius clasping mechanism with collapsible "fingers," (described in further detail below) in order to simulate the limitations of a real human shoulder during certain movements of the shoulder joint. In some embodiments, the shoulder springs have two 250 mm springs and one 400 mm spring. In such embodiments, this allows the arm to easily reach straight up and for the arm to go rotate behind its back as well as rotate toward the neck.

In some embodiments, each arm 114 includes an elbow assembly 108. In some embodiments, each elbow assembly 108 includes 2 springs to connect an upper arm (bicep/tricep) portion of arm 114 to a forearm portion of arm 114. In some embodiments, elbow assembly 108 comprises a 250 mm spring attached to the ulna, serving to secure the ulna within elbow assembly 108. In some embodiments, as the user pulls the forearm downward, the elbow functions as the fulcrum. Additionally, in some embodiments, a 150 mm spring, connected to the radius, provides additional resistance and aids in maintaining the ulna spring in its initial position. In some embodiments, each arm 114 includes a wrist assembly 110. In such embodiments, each wrist assembly 110 includes 2 springs to connect the forearm portion of arm 114 to a hand 116. In some embodiments, the wrist springs, measuring 100 mm, are interconnected with both the ulna and radial portions. In such embodiments, their primary flexibility lies in the forward-to-backward direction, allowing for easier flexion in that plane compared to side-to-side tilting.

According to various embodiments, apparatus 100 includes 2 hip assemblies 104 that connect two legs 112 to torso 102. In some embodiments, each hip assembly 112 comprises 4 springs that help apparatus 100 get into various guarding positions (discussed in further detail below). In some embodiments, hip assembly 104 is equipped with four 250 mm springs arranged in a trapezoidal configuration. In such embodiments, this specific arrangement enables the leg to exhibit greater flexibility in the front-to-back bending direction compared to side-to-side bending. In some embodiments, each leg 112 includes a knee assembly 118 comprising 3 springs that connect a thigh portion of leg 112 to a calf portion of leg 112. In some embodiments, the first spring is positioned at the top where the kneecap is located, thereby facilitating easier forward and backward bending of the knee compared to lateral movement. Additionally, in such embodiments, there are parallel springs situated on the back side of the knee, simulating the function of the thigh muscles. In some embodiments, each leg 112 also includes an ankle assembly 120 comprising 2 springs that connect the calf portion of leg 112 to a foot 122. In some embodiments, foot 122 incorporates 100 mm springs positioned on the top surface, thereby mimicking the function of ligaments. In such embodiments, these springs facilitate the popping action when the foot is flexed forward, providing a realistic simulation of ligament movement in the foot.

According to various embodiments, apparatus 100 includes a head 124, connected to a neck 126 by 3 springs. In some embodiments, a triangular configuration of neck springs is established in neck 126, with one spring positioned forward and two springs positioned rearward. In such embodiments, the two rearward springs are in close proximity to each other. Such an arrangement enables the neck springs to readily exhibit a significantly greater degree of lateral bending, as compared to anterior-posterior bending. In some embodiments, head 124 includes a display for showing feedback to the user or playing various media, e.g., training videos. In some embodiments, head 124 includes a processor and/or a controller for controlling the electronics in apparatus 100. In some embodiments, head 124 includes LED lights to indicate the effectiveness of a choke or a hold.

In some embodiments, apparatus 100 includes mechanical joints that simulate breaks and dislocations as a result of particular moves correctly executed by a user. As used herein, mechanical joints refer to joints that can move in response to physical interaction with a user or joints that can simulate breaks, dislocations, and injuries with tactile feedback. In some embodiments, apparatus 100 includes position sensors to determine what position apparatus 100 is in during a training session. In some embodiments, apparatus 100 also includes motion sensors to detect movement of a user. In some embodiments, apparatus 100 includes audio functions to play media or provide auditory feedback to the user. In some embodiments, apparatus 100 also includes an outer covering configured to emulate human skin for a more realistic tactile experience. In some embodiments, apparatus 100 includes Wifi and Bluetooth capabilities in order to interact with a mobile device or remote computer. In some embodiments, apparatus 100 includes one or more cameras to record training sessions with a user.

Figure 2:
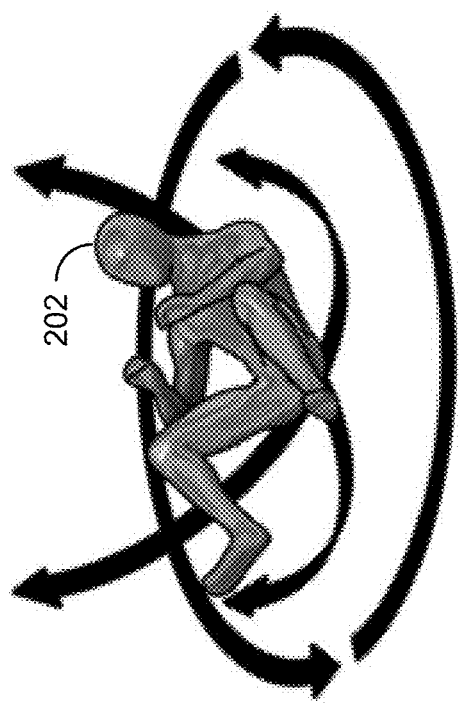
FIG. 2 shows an example of a reflexive training apparatus in a supine position, in accordance with embodiments of the present disclosure.
Figure 2:

FIG. 2 shows an example of a reflexive training apparatus in a supine position, in accordance with embodiments of the present disclosure. FIG. 2 includes multiple views of an apparatus to show the different moving positions. View 200 illustrates multiple positions where apparatus 202 can lean, tilt, rotate, or swivel. In some embodiments, apparatus 202 is configured to be in the supine position as its natural position. In some embodiments, apparatus 202 lays on its back in the supine position. In some embodiments, the shape of the supine position only allows the bare minimum surface area to contact the floor. In such embodiments, this allows apparatus 202 to move and spin very easily similarly to a top. In such embodiments, apparatus 202 can rock forward, back, side to side, and spin. In some embodiments, the supine position is very practical in terms of drilling, since a live partner is trained to move in this very way. When pressure is applied to any part of apparatus 202, it will tip over to that side very easily causing the entire apparatus to rock, thereby making a user's contact points less stable. As a result, the user is required to be precise in their movements and pressure.

In some embodiments, the apparatus has a unique leg position. In such embodiments, the knees are touching its elbows in the resting position. With this position, the apparatus is an improvement over standard training dummies because the apparatus can maintain knees touching elbows in the resting position. In some embodiments, this is accomplished via a combination of wedges and springs. In some embodiments, the arm shape, e.g., the forearm and the bicep, is configured to act as wedges to semi support itself. In addition, one or more springs are placed in the apparatus to maintain the shape and the position. The ability to maintain that position is important because it simulates an actual opponent being in a safe defensive position against a real person.

In some embodiments, because of the apparatus's curved spine, if a user does not put their hands in the exact right spot, the apparatus will tip over. This leads to the user's hands being very unstable or prone to slipping off. This results in simulating interaction with a human because a human would not allow an opponent to just lay on them and let the opponent put all their weight on the human. A human is going to turn to their side.

Figure 3:
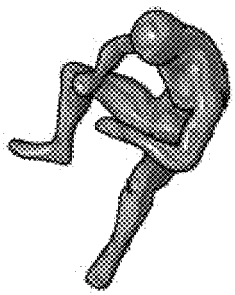
FIG. 3 illustrates natural defense positions of an example reflexive training apparatus, in accordance with embodiments of the present disclosure.
Figure 3:
Figure 3:
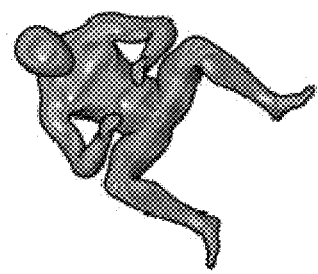
Figure 3:
Figure 3:
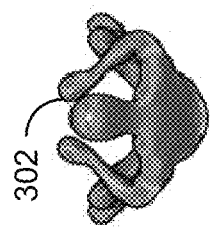

FIG. 3 illustrates natural defense positions of an example reflexive training apparatus, in accordance with embodiments of the present disclosure. In Brazilian jiu-jitsu, in order to drill movements in repetition effectively, a drilling partner must have a defensive reaction in the same way each time a movement is performed. Often times, this translates to body position and body weight distribution. In some embodiments, apparatus 302 is configured to have the proper body defense mechanics by protecting its abdomen via touching its knees to its elbows. In some embodiments, apparatus 302 includes joints that are configured to go back to its natural state using springs in its joints.

Figure 4:
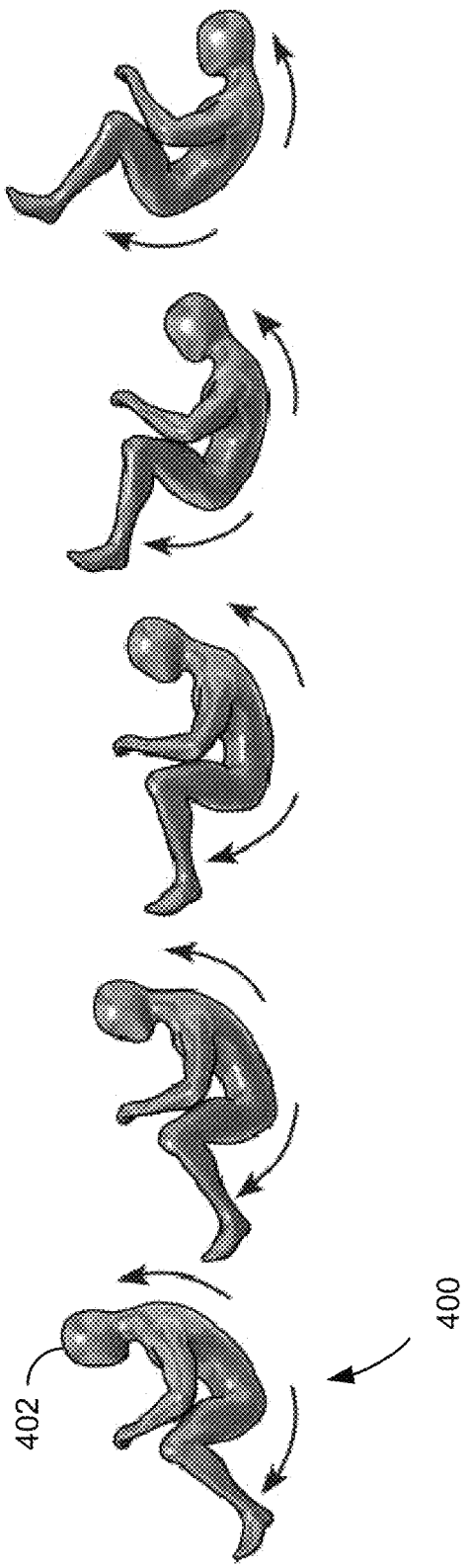
FIG. 4 illustrates a sitting guard position of an example reflexive training apparatus, in accordance with embodiments of the present disclosure.

FIG. 4 illustrates a sitting guard position of an example reflexive training apparatus, in accordance with embodiments of the present disclosure. In some embodiments, while in the sitting guard position 400, the majority of the weight is leaning forward (because the combination of the arms and legs weighs more than the torso), while the tension in the legs, due to the orientation of the springs in the legs and hips forming an A-frame structure, prevents apparatus 402 from collapsing on its front. In some embodiments, a lot of the tension is in the hip assembly. In some embodiments, apparatus 402 will maintain its defensive position while sitting or being tipped directly backward, the same way a grappler naturally would. Additionally, in some embodiments, apparatus 402 will not lean back to a static position. In other words, depending on the force, apparatus 402 will roll back and to a side instead of just laying flat. In some embodiments, given the right amount of force, apparatus 402 will go into the turtle position.

Figure 5:
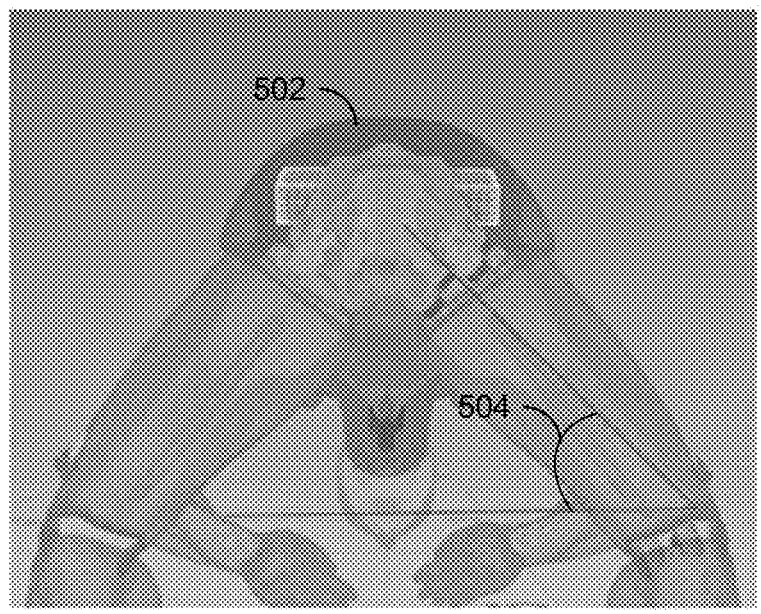
FIG. 5 illustrates a turtle position of an example reflexive training apparatus, in accordance with embodiments of the present disclosure.

FIG. 5 illustrates a turtle position of an example reflexive training apparatus, in accordance with embodiments of the present disclosure. In FIG. 5, the butt of the apparatus is facing the reader. In some embodiments, apparatus 502 can sustain the turtle position with a person's weight on its back without collapsing due to its structural configuration. In some embodiments, while in the turtle position, apparatus 502 can support up to 250 lbs directly on its back without collapsing. In some embodiments, apparatus 502 can support a significant amount of weight because of three factors. First, the head and legs together form a very sturdy tripod. Second, the angle 504 that the thigh makes with the ground does not become smaller than 50 degrees. This predetermined threshold is empirically derived to be the minimum angle needed for stability in the turtle position. In some embodiments, this is accomplished via adding four springs in a trapezoidal configuration into the hip assembly. Last, the hip assembly also comes with a hip cap that physically restrains the legs from flattening out (or doing the horizontal splits). In Brazilian jiu-jitsu, the turtle position is an extremely important position for grappling. The turtle position is defined as a position that a person assumes with both knees and hands on the ground, while hunched over. An effective drilling partner will provide a sturdy base in order for the user to be able to perform complex movements on all sides of the body. In some embodiments, apparatus 502 is structurally stable and strong enough in the turtle position to withstand a user's body weight, while still keeping its limbs free for other maneuvers.

Figure 6:
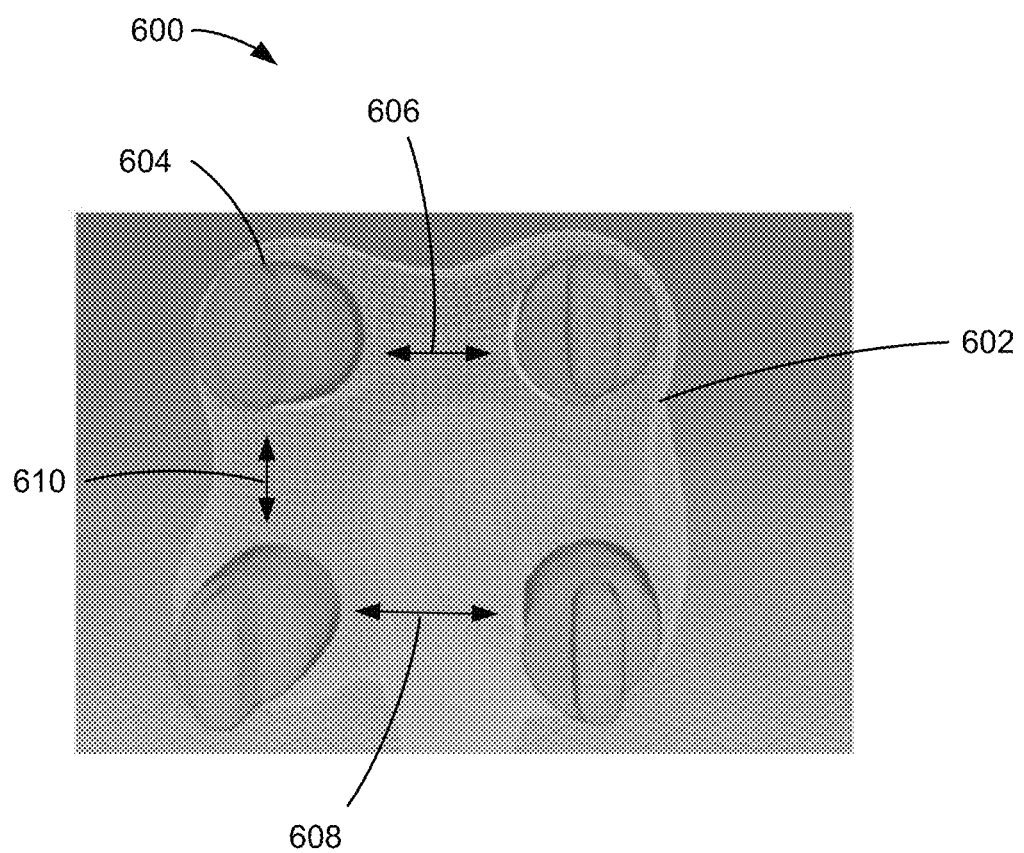
FIG. 6 shows an example hip assembly, in accordance with embodiments of the present disclosure.

FIG. 6 shows an example hip assembly, in accordance with embodiments of the present disclosure. Hip assembly 600 includes a hip anchor dock 602 with 4 spring ports arranged in a trapezoidal configuration. Each spring port is configured to hold a spring 604, which together combines to simulate a hip joint. In some embodiments, the width distances 606 and 608 are wider than the height distance 610. In addition, bottom width distance 608 is even wider than top width distance 606. According to various embodiments, this very particular arrangement of the springs is important because the joint needs to be able to move vertically up and down much easier than horizontally left and right. Since the closer the springs are together, the easier it is to bend the springs, the springs need to be closer together in the vertical direction.

While different positions of the reflexive training apparatus have been described above, one advantage of the apparatus described herein is the ability to simulate actual injuries sustained from executing various Brazilian jiu-jitsu moves, such as choke holds, arm bars, leg locks, etc. One of the most common injuries is a lateral knee injury sustained during execution of a leg lock or heel hook.

Figure 7B:
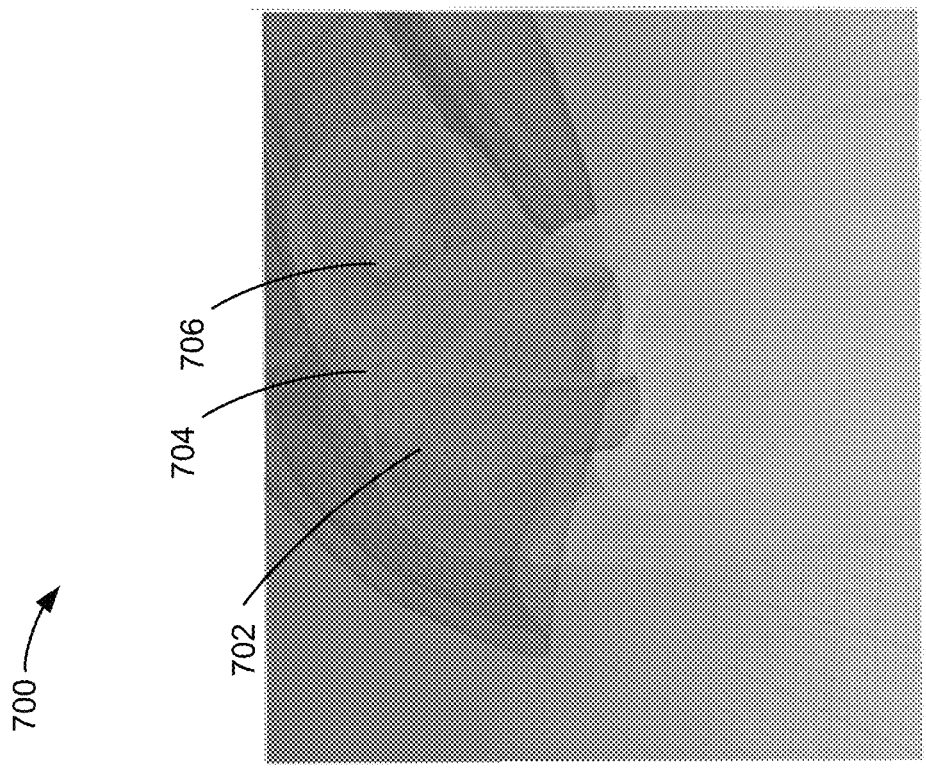
FIGS. 7A-7B show an example of a lateral knee injury simulation, in accordance with embodiments of the present disclosure.
Figure 7A:
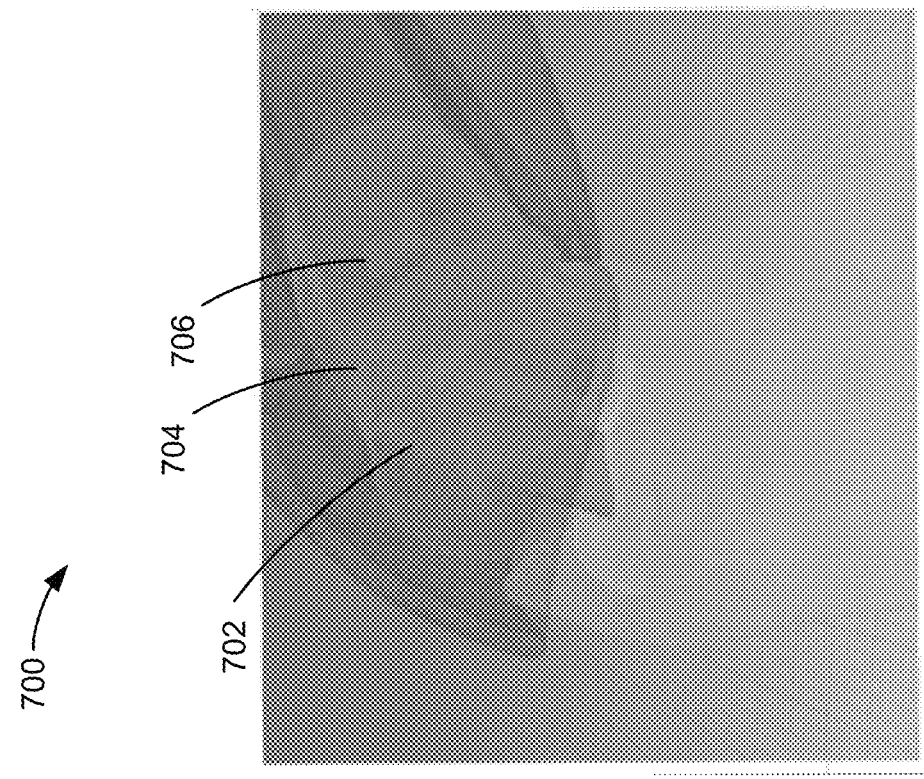

FIGS. 7A-7B show an example of a lateral knee injury simulation, in accordance with embodiments of the present disclosure. Lateral knee injuries are inherently challenging to practice with a human partner due to their potentially catastrophic nature. The force, speed, and pressure required to induce damage to the Medial Collateral Ligament (MCL) can vary significantly based on the strength, skill, and body composition of the individuals involved. To address this, knee assembly 700 offers a simulation of ACL, MCL, and LCL tears, along with hyperextension, achieved by displacing the knee from its natural alignment. Knee assembly 700 comprises several interrelated components, including three springs 702, 704, and 706, as shown in FIG. 7A. Two of these springs, 704 and 706 are arranged in parallel, functioning both as muscle analogs and stabilizers for the calf. The top spring 702 serves as a surrogate kneecap and aids in preventing calf rotation. The bone components mimic the anatomical shapes of the femur and tibia. FIG. 7A shows the knee assembly 700 in a normal position. FIG. 7B shows knee assembly 700 after sustaining a lateral knee injury. In some embodiments, when the leg is twisted (e.g., rotating the heel inwards), users can perceive the interaction of these bone components, thereby simulating the effects of a catastrophic injury.

Figure 7C:
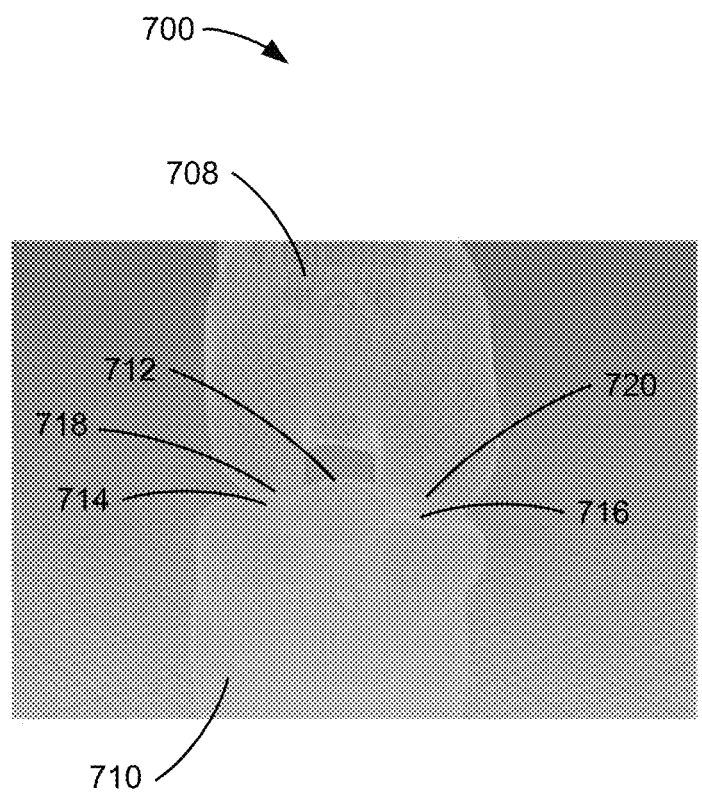
FIG. 7C shows an example of a knee assembly without the springs, in accordance with embodiments of the present disclosure.

FIG. 7C shows an example of a knee assembly without the springs, in accordance with embodiments of the present disclosure. Knee assembly 700 shows a femoral anchor 708 coupled to a tibia anchor 710, without the springs. As shown in FIG. 7C, tibia anchor 710 includes a bulge 712 and two divots 714 and 716. Femoral anchor 708 includes two knobs 718 and 720, configured to fit into the grooves of divots 714 and 716, respectively. During a lateral knee injury simulation, tibia anchor 710 twists to the left and femoral anchor 708 becomes displaced to the right of its natural resting position. During displacement, knob 720 moves out of divot 716, slides over hump 712, and eventually lands in divot 714. As knob 720 slides over hump 712, the grinding of knob 720 along hump 712 results in a "pop" sound as knob 720 settles into divot 714, which simulates the popping sound associated with injuries to the ACL, MCL, or LCL.

Figure 8B:
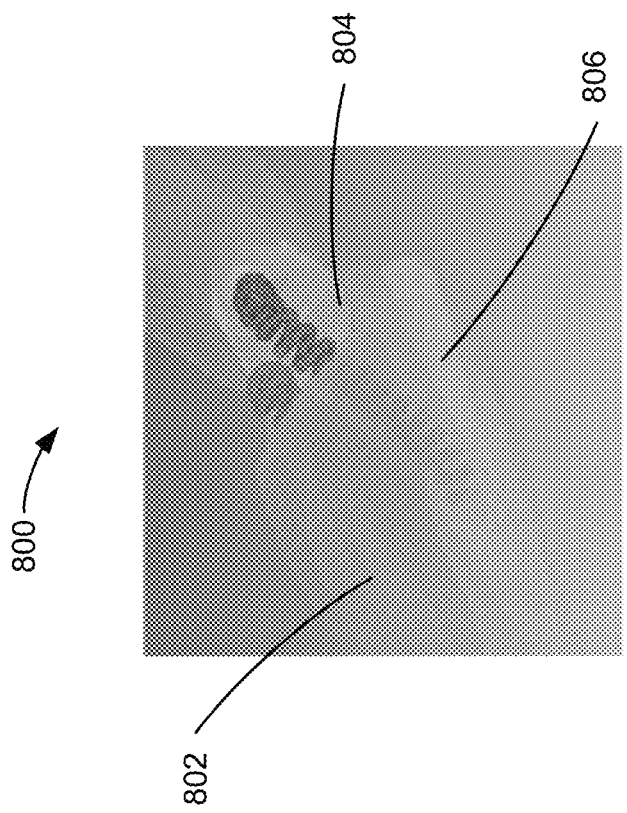
Figure 8A:
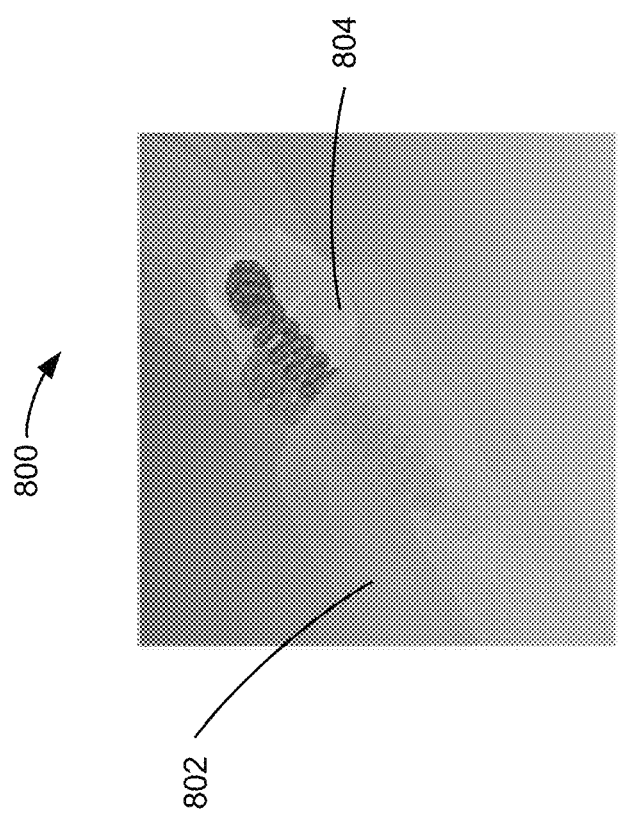
Figures 8E, 8F:
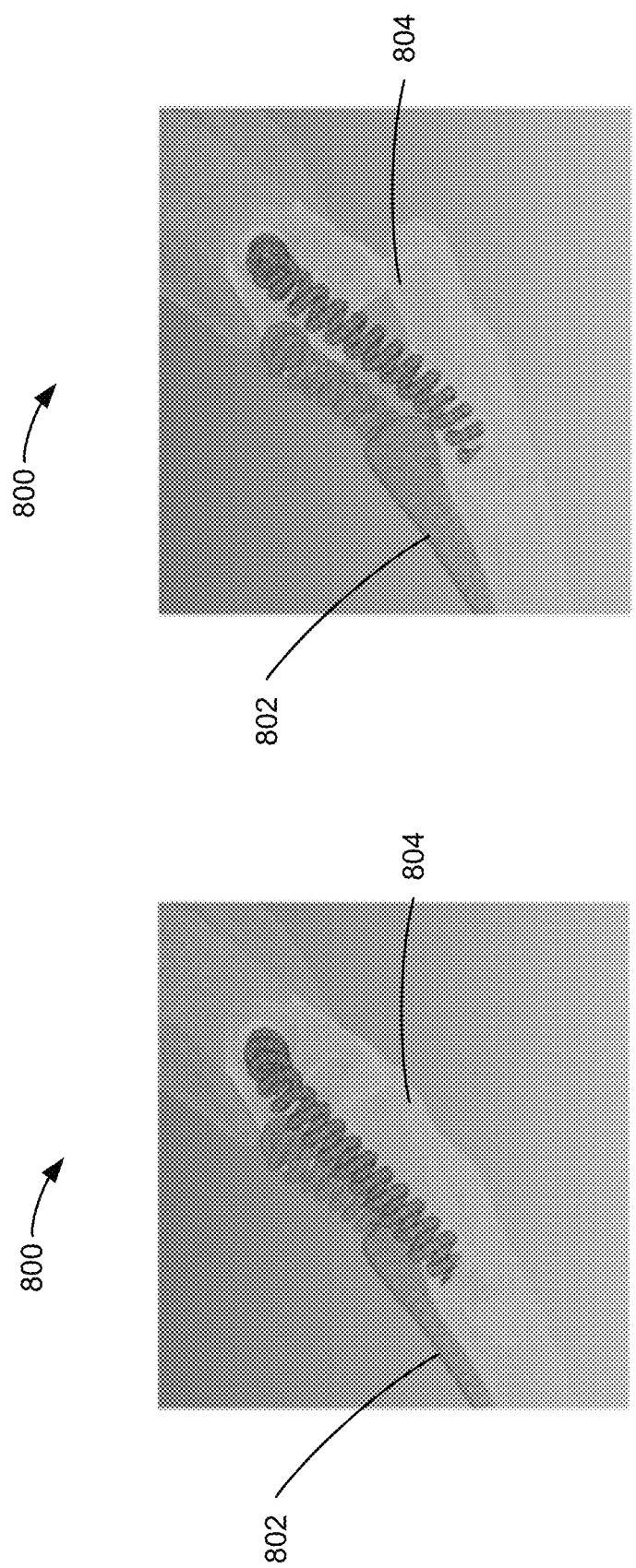

Another common injury in Brazilian jiu-jitsu is an elbow dislocation. FIGS. 8A-8F show an example of an elbow dislocation, in accordance with embodiments of the present disclosure. In the context of simulating an elbow dislocation, a user is prompted to extend forearm 802 to its complete extension. Subsequently, a twisting motion of the ulna bone 804 in forearm 802 toward the inside is necessary to induce the dislocation. Two grooves/slits 806 along forearm 802 facilitate bone displacement by splitting open, which allows the ulna bone 804 to protrude out, thereby simulating an elbow dislocation. In some embodiments, the inherent stiffness of the forearm contour, due to the hardness of the material the comprises the forearm skin surface, in conjunction with the tension of the springs, causes the bones to revert to their natural alignment once force is released. In some embodiments, the forearm skin surface comprises a very hard material, such as PETG plastic. In some embodiments, to reset the dislocated arm, the user needs to simply bring the hand into contact with the chest, thereby initiating a reset of the bone positions. FIGS. 8A-8B show on perspective view of an elbow dislocation. FIGS. 8C-8D show another perspective view of an elbow dislocation. FIGS. 8E-8F show an elbow dislocation without the skin coverings.

Figure 9G:
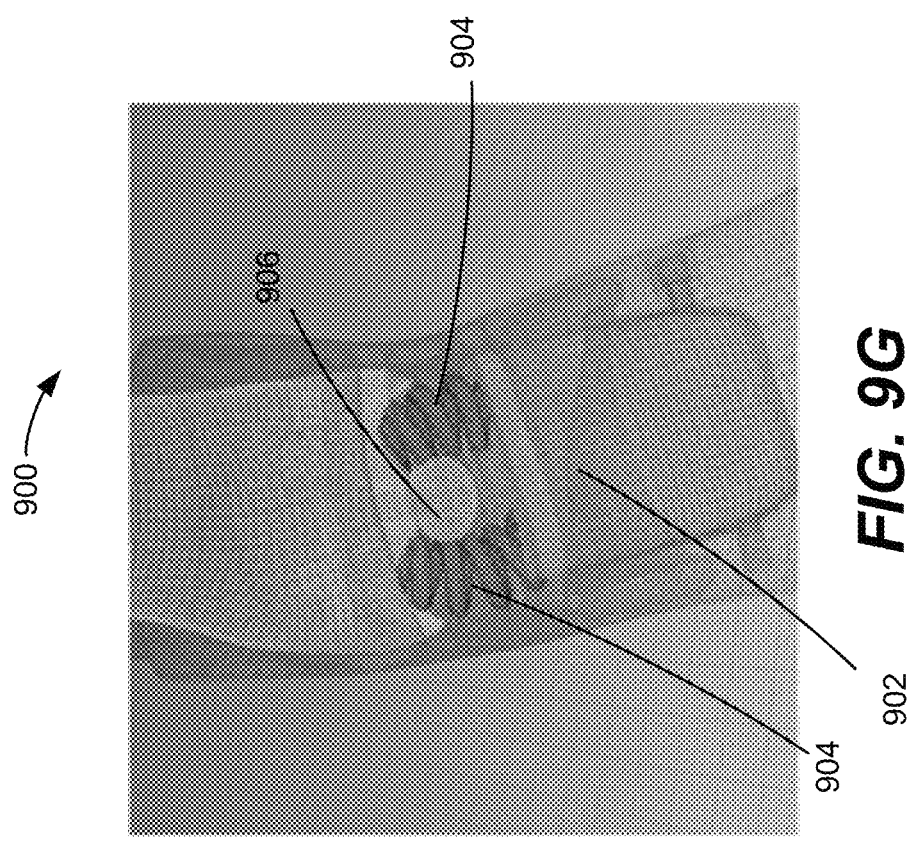

Another common injury in Brazilian jiu-jitsu is an ankle dislocation or a foot injury. FIGS. 9A-9G show an example of a foot injury, in accordance with embodiments of the present disclosure. Ankle assembly 900 is designed to be able to emulate a foot injury/ankle dislocation by reproducing the sensation akin to a "pop" resulting from the interaction between the metatarsal bones and other tarsal bones. In some embodiments, the sensation is accomplished via a specialized popping mechanism built into ankle assembly 900. Within spring housing 902, a constraint mechanism effectively limits the mobility of springs 904, thereby producing an opposing force to being dislocated. In other words, in the resting position, spring housing 902 prevents stretching of springs 904 in the horizontal direction, but does allow springs 904 to stretch in the vertical direction. Thus, in the resting position, tactile bump 906 stays behind springs 904 and does not shift forward passed springs 904 without a user stretching the springs first. In order to simulate the foot injury, the user pulls on the foot such that the toes become pointed, thereby stretching springs 904. If sufficient force is applied, springs 904 become thin enough for tactile bump 906 to pass through the middle of both springs 904 in the foot. The tactile feeling allows the user to experience a pronounced popping sensation. FIGS. 9A-9C show a perspective view of the foot injury. FIGS. 9D-9F show a top view of the foot injury without spring housing 902. FIG. 9G shows a top view of ankle assembly 900 after the foot injury.

Figure 10B:
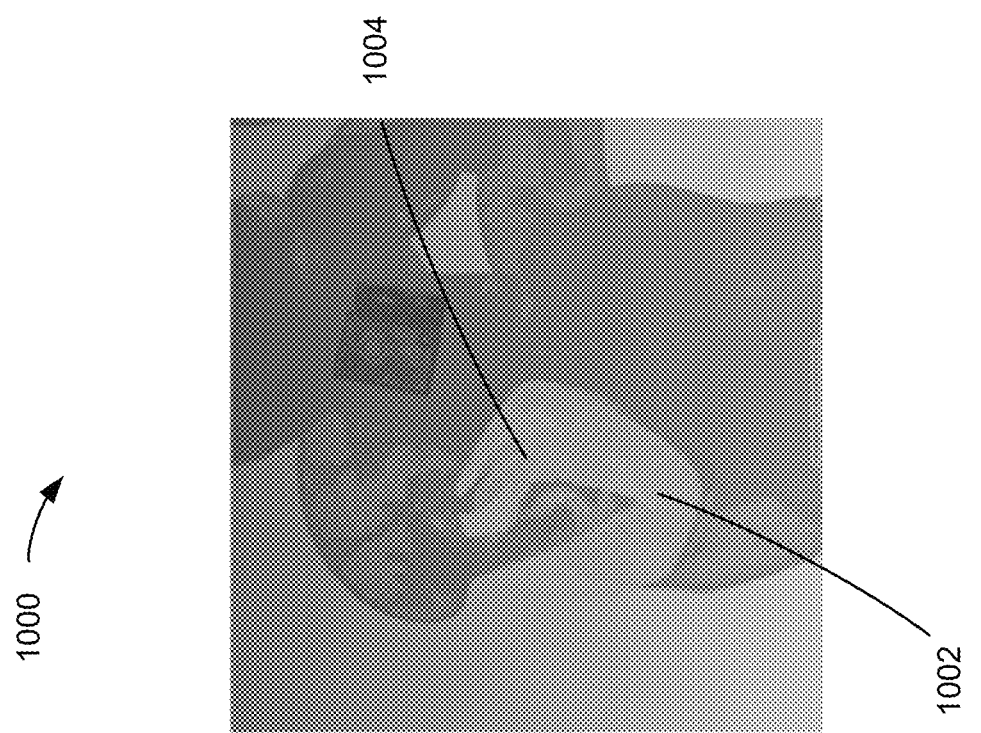
FIGS. 10A-10B show an example of a choke hold, in accordance with embodiments of the present disclosure.
Figure 10A:
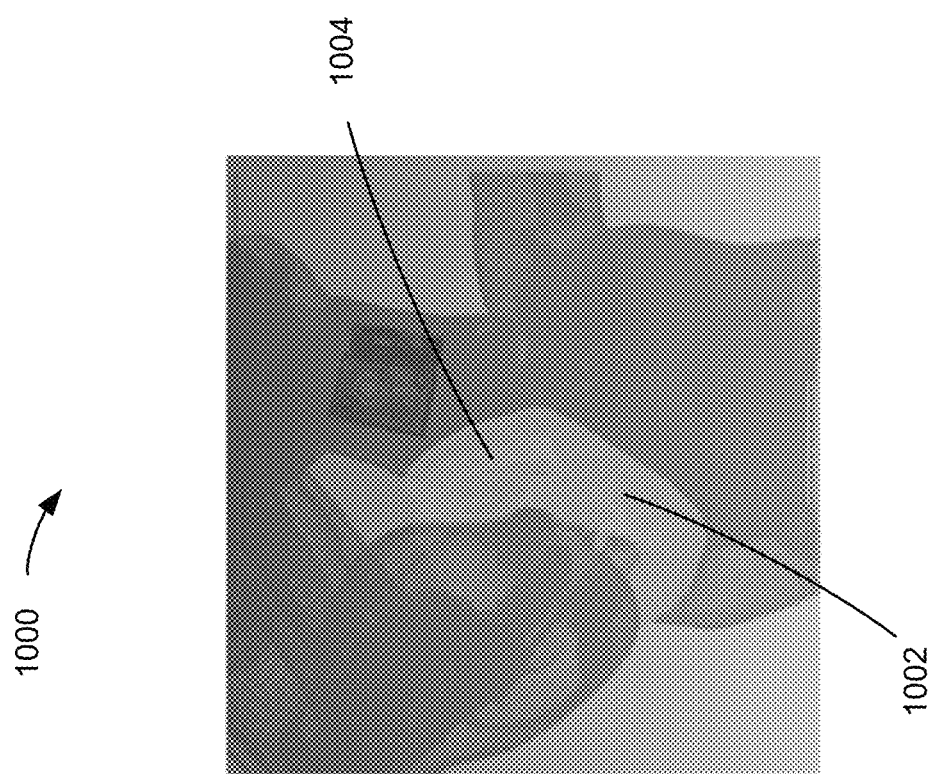

Another common injury in Brazilian jiu-jitsu is choke hold, e.g., an arm triangle choke. FIGS. 10A-10B show an example of a choke hold, in accordance with embodiments of the present disclosure. Numerous chokehold techniques encompass various methods wherein the bicep muscle is positioned to intersect with the carotid artery just below the chin. To facilitate this alignment, shoulder assembly 1000 includes a trapezius clasping mechanism 1002. Trapezius clasping mechanism 1002 includes a set of collapsible fingers that aid in simulating a choke hold by having each finger retract (or collapse one by one) as the should moves up and over, thereby creating an unobstructed path for the bicep to engage with the carotid artery sensor. This design solves the issue of rigidity, which limits arm movement in a shoulder joint, due to a fixed volume problem with plastic material. Because the fingers are collapsible, the volume is no longer fixed. In some embodiments, although the trapezius clasping mechanism 1002 collapses to create an unobstructed path for the bicep, the fingers collapse one by one, which creates some resistance along the movement to simulate resistance in real life.

Figure 11B:
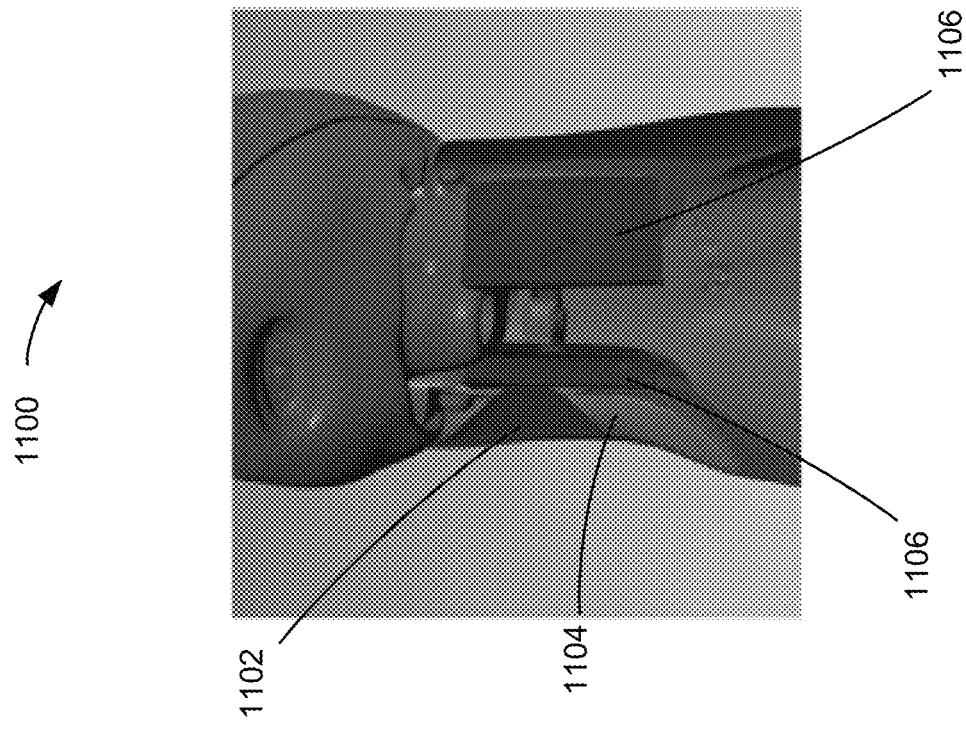
FIGS. 11A-11B illustrate a neck assembly, in accordance with embodiments of the present disclosure.
Figure 11A:
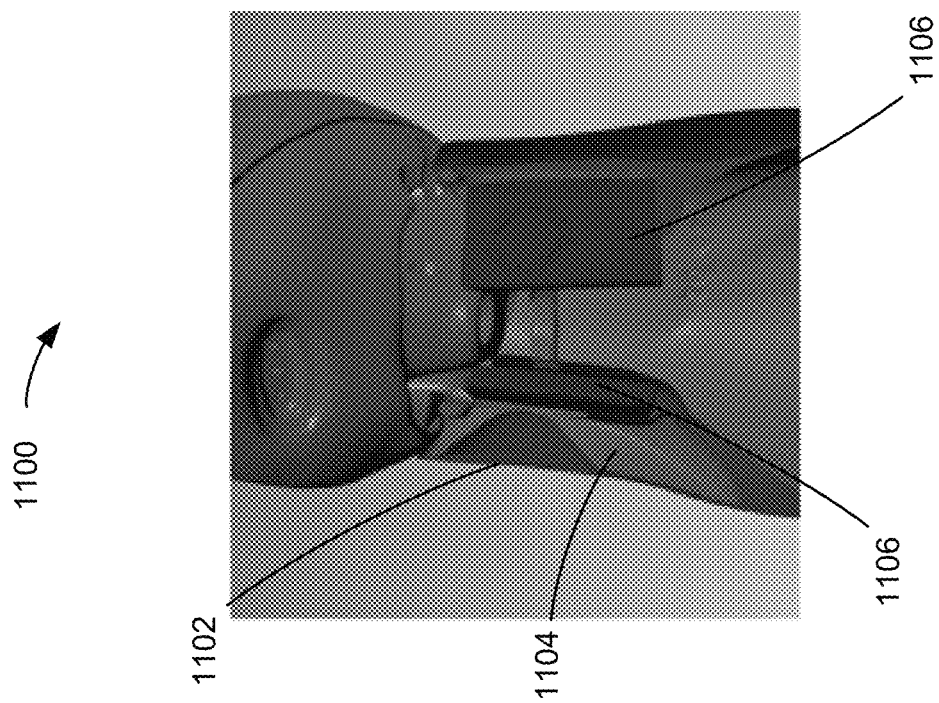

While FIGS. 10A-10B show how the trapezius clasping mechanism 1002 collapses to make room for the bicep to come into contact with the carotid in the neck, FIGS. 11A-11B illustrate a neck assembly, in accordance with embodiments of the present disclosure. In some embodiments, contained within neck assembly 1100 is a button 1102 located within a region of void (negative space) 1104. The region of void 1104 enables button 1102 to pivot at variable angles. Activation of button 1102 is contingent upon its alignment with sensor 1106. Because the region of void 1104 allows button 1102 to pivot at variable angles, if the button's angle of approach deviates from a direct orientation with sensor 1106, the sensor will not trigger. This necessitates the user to apply direct pressure onto the sensor, which simulates a need for the user to apply direct pressure onto the carotid artery in order to successfully carry out the choke, as shown in FIG. 11B.

In some embodiments, sensors 1106 includes a circular pattern around the circle on the sensor. In some embodiments, the circular pattern is etched into sensor. In some embodiments, the circular pattern causes the surface of the cover of the sensor to act like a spring, thereby adding more flexibility to the plastic cover of the sensor and allowing the sensor to be easily pushed in, while still protecting the sensor. In some embodiments, the pattern is made of thermoplastic polyurethane (TPU) flexible plastic.

Figure 12:
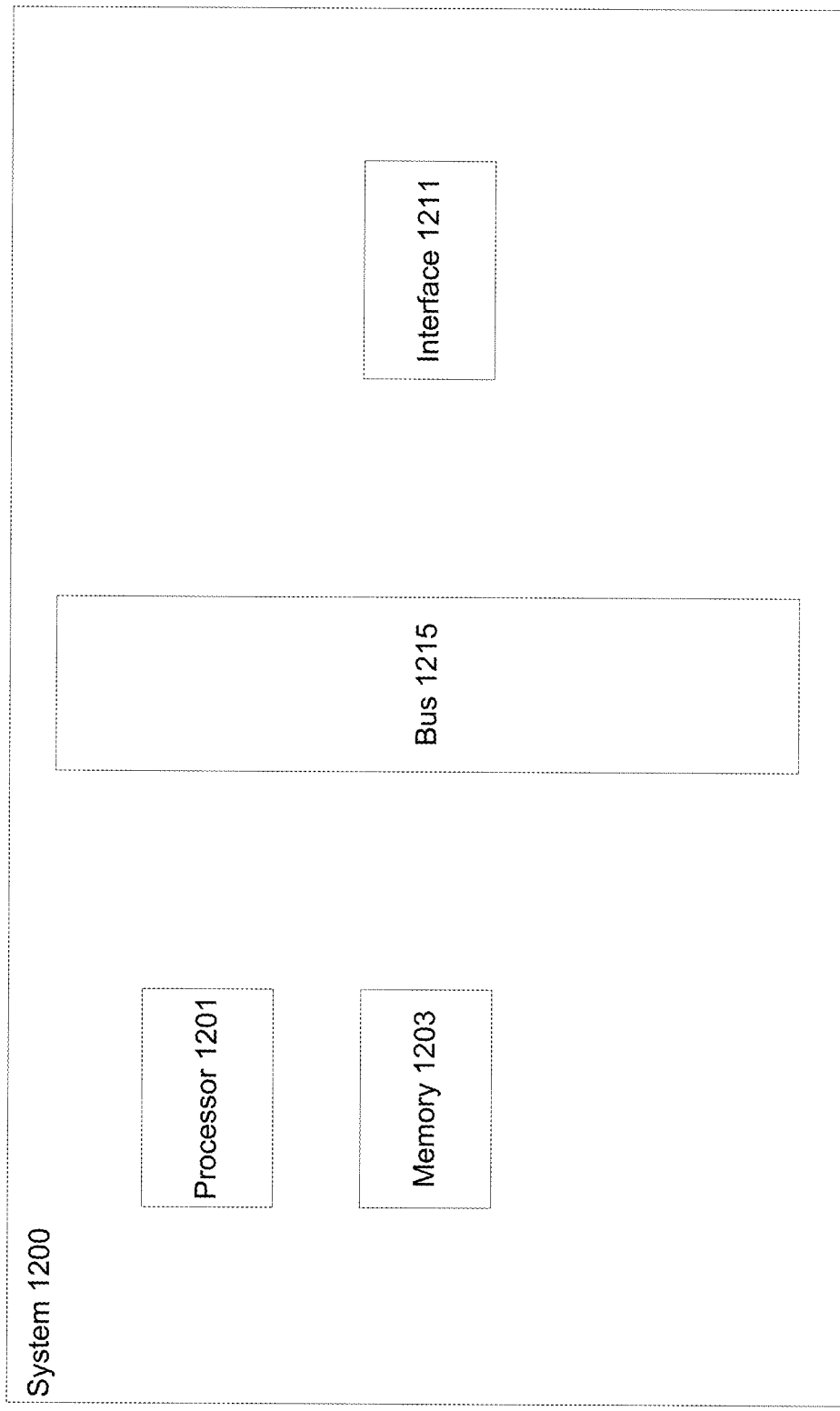
FIG. 12 illustrates an example of a computer system, configured in accordance with one or more embodiments of the present disclosure.

The examples described above present various features that utilize a computer system or a reflexive training apparatus that includes a computer. However, embodiments of the present disclosure can include all of, or various combinations of, each of the features described above. FIG. 12 illustrates one example of a computer system, in accordance with embodiments of the present disclosure. According to particular embodiments, a system 1200 suitable for implementing particular embodiments of the present disclosure includes a processor 1201, a memory 1203, an interface 1211, and a bus 1215 (e.g., a PCI bus or other interconnection fabric). When acting under the control of appropriate software or firmware, the processor 1201 is responsible for implementing applications such as an operating system kernel, a containerized storage driver, and one or more applications. Various specially configured devices can also be used in place of a processor 1201 or in addition to processor 1201. The interface 1211 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 1200 is a computer system configured to run electronics on a reflexive training apparatus, as shown herein. In some implementations, one or more of the computer components may be virtualized. For example, a physical server may be configured in a localized or cloud environment. The physical server may implement one or more virtual server environments in which some of the computer modules are executed. Although a particular computer system is described, it should be recognized that a variety of alternative configurations are possible. For example, the modules may be implemented on another device connected to the computer system.

In the foregoing specification, the present disclosure has been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure.

What is claimed is:

1. A reflexive training apparatus comprising:
   a dummy body including a head, neck, and four limbs, wherein the four limbs include two legs;
   wherein the dummy body is configured to assume sitting and supine guard positions, as well as a turtle position configured to support a person's weight of at least 100 pounds without collapsing due to the structural positioning of the head and legs and a hip mechanism that physically restrains the legs from flattening, in response to physical interaction with a user;
   wherein while the dummy body is in the supine guard position, the shape of the supine position only allows a surface area to contact with the ground such that the dummy body can rock forward, back, side to side, and spin while in the supine guard position;
   wherein the neck includes sensors for indicating effective choke positions and pressure; and
   wherein the four limbs include joints that provide tactile simulation of injuries resulting from moves executed on the limbs by the user.

2. The reflexive training apparatus of claim 1, wherein while the dummy body is in the turtle position, the dummy body can support up to 250 lbs on its back without collapsing.

3. The reflexive training apparatus of claim 1, wherein while the dummy body is in the supine position, the dummy body is touching the ground with a curved back curving away from the ground.

4. The reflexive training apparatus of claim 1, wherein at least one of the four limbs includes an elbow joint that simulates an arm break with a bone protrusion.

5. The reflexive training apparatus of claim 1, wherein at least one of the four limbs includes a knee joint that simulates a ligament injury with tactile feedback.

6. The training apparatus of claim 1, further comprising one or more cameras for recording training sessions.

7. The reflexive training apparatus of claim 1, further comprising a processor to control electronic features.

8. The reflexive training apparatus of claim 1, further comprising one or more of the following:
   a display, light emitting diode (LED) lights, position sensors, motion sensors, pressure sensors, audio functions, and an outer covering configured to emulate skin.

9. The reflexive training apparatus of claim 1, wherein the joints are mechanical.

10. The reflexive training apparatus of claim 1, further comprising Wifi and Bluetooth capabilities.

11. A system comprising:
a dummy body including a head, neck, and four limbs, wherein the four limbs include two legs;
wherein the dummy body is configured to assume sitting and supine guard positions, as well as a turtle position configured to support a person's weight of at least 100 pounds without collapsing due to the structural positioning of the head and legs and a hip mechanism that physically restrains the legs from flattening, in response to physical interaction with a user;
wherein while the dummy body is in the supine guard position, the shape of the supine position only allows a surface area to contact with the ground such that the dummy body can rock forward, back, side to side, and spin while in the supine guard position;
wherein the neck includes sensors for indicating effective choke positions and pressure; and
wherein the four limbs include joints that provide tactile simulation of injuries resulting from moves executed on the limbs by the user.

12. The system of claim 11, wherein while the dummy body is in the turtle position, the dummy body can support up to 250 lbs on its back without collapsing.

13. The system of claim 11, wherein while the dummy body is in the supine position, the dummy body is touching the ground with a curved back curving away from the ground.

14. The system of claim 11, wherein at least one of the four limbs includes an elbow joint that simulates an arm break with a bone protrusion.

15. The system of claim 11, wherein at least one of the four limbs includes a knee joint that simulates a ligament injury with tactile feedback.

16. The system of claim 11, further comprising one or more cameras for recording training sessions.

17. The system of claim 11, further comprising a processor to control electronic features.

18. The system of claim 11, further comprising one or more of the following:
a display, light emitting diode (LED) lights, position sensors, motion sensors, pressure sensors, audio functions, and an outer covering configured to emulate skin.

19. The system of claim 11, wherein the joints are mechanical.

20. The system of claim 11, further comprising Wifi and Bluetooth capabilities.

* * * * *